(12) United States Patent
Kondapalli

(10) Patent No.: US 8,787,197 B2
(45) Date of Patent: Jul. 22, 2014

(54) GLOBAL SWITCH RESOURCE MANAGER

(71) Applicant: Marvell World Trade Ltd., St. Michael (BB)

(72) Inventor: Raghu Kondapalli, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/905,776

(22) Filed: May 30, 2013

(65) Prior Publication Data

US 2013/0259064 A1 Oct. 3, 2013

Related U.S. Application Data

(63) Continuation of application No. 11/504,524, filed on Aug. 15, 2006, now Pat. No. 8,457,007.

(60) Provisional application No. 60/776,584, filed on Feb. 24, 2006.

(51) Int. Cl.
*H04L 12/26* (2006.01)
*H04L 12/28* (2006.01)
*H04L 12/66* (2006.01)

(52) U.S. Cl.
USPC ............ 370/252; 370/351; 370/463; 370/912

(58) Field of Classification Search
CPC ................................ H04L 47/70; H04L 47/80
USPC ......... 370/229–231, 235, 236, 241, 252, 351, 370/389, 419, 431, 463
See application file for complete search history.

(56) References Cited

U.S. PATENT DOCUMENTS

| 5,477,538 | A | 12/1995 | Huenlich |
| 6,789,118 | B1 | 9/2004 | Rao |
| 2003/0002471 | A1 | 1/2003 | Crawford et al. |
| 2003/0033467 | A1* | 2/2003 | Yoshizawa et al. ........... 710/305 |

(Continued)

FOREIGN PATENT DOCUMENTS

| CN | 1531274 | 9/2004 |
| JP | 2002-135316 | 5/2002 |

(Continued)

OTHER PUBLICATIONS 802.11 n; IEEE P802.11-04/0889r6; Wireless LANs, TGn Sync Proposal Technical Specification; 131 pages.

(Continued)

*Primary Examiner* — Omar Ghowrwal

(57) ABSTRACT

A network device includes an input circuit configured to receive a plurality of data streams. An output circuit is configured to transmit the plurality of data streams. A forwarding engine includes a plurality of different types of resources associated with transmission of the plurality of data streams and is configured to transfer data streams from the input circuit to the output circuit according to the plurality of different types of resources. A resource manager is configured to determine performance requirements for each of the plurality of data streams, determine whether the performance requirements for each of the plurality of data streams can be accepted, store data entries corresponding to the performance requirements in response to a determination that the performance requirements can be accepted, and program, for each of the plurality of data streams, the plurality of different types of resources based on the data entries.

20 Claims, 6 Drawing Sheets

(56) References Cited

U.S. PATENT DOCUMENTS

| | | | |
|---|---|---|---|
| 2003/0079018 | A1 | 4/2003 | Lolayekar et al. |
| 2003/0081626 | A1 | 5/2003 | Naor et al. |
| 2003/0097460 | A1 | 5/2003 | Higashiyama et al. |
| 2004/0105415 | A1* | 6/2004 | Fujiwara et al. ............... 370/338 |
| 2004/0172470 | A1 | 9/2004 | Shiina |
| 2004/0205166 | A1 | 10/2004 | DeMoney |
| 2006/0013132 | A1 | 1/2006 | Garnett et al. |
| 2006/0291404 | A1 | 12/2006 | Thubert et al. |

FOREIGN PATENT DOCUMENTS

| | | |
|---|---|---|
| JP | 2003-158543 | 5/2003 |
| JP | 2003-258893 | 9/2003 |
| WO | WO 98/51060 | 11/1998 |
| WO | WO 00/51290 | 8/2000 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

Communication and Search Report from the European Patent Office dated Jul. 3, 2007 for Application No. 07 003 496.2-1525; 6 pages.

Communication enclosing the First Office Action dated Dec. 14, 2010 for Chinese Patent Application No. 20071 0092305.X; 26 pages.

Communication enclosing the Notice of Reasons for Rejection dated Oct. 12, 2011 for Japanese Patent Application No. 2007-044450; 6 pages.

Communication enclosing the Notice of Reasons for Rejection dated May 9, 2011 for Japanese Patent Application No. 2007-044450; 7 pages.

IEEE 802.20-PD-06, IEEE P 802.20 V 14, Jul. 16, 2004, Draft 802.20 Permanent Document, System Requirements for IEEE 802.20 Mobile Broadband Wireless Access Systems—Version 14, 23 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11a-1999 (Supplement to IEEE Std 802.11-1999) [Adopted by ISO/IEC and redesignated as ISO/IEC 8802-11: 1999/Amd 1 :2000(E)]; Supplement to IEEE STANDARD for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 19991EEE-SA Standards Board; 96 gages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

* cited by examiner

GLOBAL SWITCH RESOURCE MANAGER

CROSS-REFERENCE TO RELATED APPLICATIONS

The present disclosure is a continuation of U.S. patent application Ser. No. 11/504,524 (now U.S. Pat. No. 8,457,007), filed on Aug. 15, 2006, which claims the benefit of U.S. Provisional Application No. 60/776,584, filed on Feb. 24, 2006. The entire disclosures of the applications referenced above are incorporated herein by reference.

BACKGROUND

The present invention relates generally to data communications. More particularly, the present invention relates to switch management.

SUMMARY

In general, in one aspect, the invention features an apparatus comprising: at least one input circuit to receive a plurality of data streams each comprising a plurality of packets of data, wherein at least one of the data streams has at least one performance requirement; at least one output circuit to transmit the data streams; a forwarding engine comprising a plurality of resources to transfer the packets of data from the at least one input circuit to the at least one output circuit; and a resource manager comprising a memory to store a data stream table, a performance requirements parser to determine the performance requirements for the at least one of the data streams, a data stream table manager to determine whether the performance requirements of the at least one of the data streams can be accepted based on entries in the data stream table, and to store the performance requirements for the at least one of the data streams as entries in the data stream table when the performance requirements for the at least one of the data streams are acceptable, and a resource programmer to program the resources according to the data stream table.

In general, in one aspect, the invention features an apparatus comprising: a plurality of resources to process packets of data in a plurality of data streams each comprising a plurality of the packets of data, wherein at least one of the data streams has at least one performance requirement; a memory to store a data stream table; a data stream table manager to determine whether the performance requirements of the at least one of the data streams can be accepted based on entries in the data stream table, and to store the performance requirements for the at least one of the data streams as entries in the data stream table when the performance requirements for the at least one of the data streams are acceptable; and a resource programmer to program the resources according to the data stream table.

In some embodiments, the data streams comprise at least one media stream. Some embodiments comprise at least one input circuit to receive the data streams; at least one output circuit to transmit the data streams; and a forwarding engine comprising at least one of the resources, wherein the at least one of the resources transfers the packets of data from the at least one input circuit to the at least one output circuit. Some embodiments comprise a performance requirements parser to determine the performance requirements for the at least one of the data streams. In some embodiments, the at least one input circuit receives a stream performance requirements packet representing the performance requirements for the at least one of the data streams; and the performance requirements parser determines the performance requirements for the at least one of the data streams based on the stream performance requirements packet. In some embodiments, to determine the performance requirements for the at least one of the data streams, the performance requirements parser parses the packets of data in the at least one of the data streams. Some embodiments comprise an alert circuit to generate an alert when the data stream table manager determines that the performance requirements for any of the data streams are unacceptable. Some embodiments comprise an alert circuit to generate an alert when one of the entries in the data stream table expires. Some embodiments comprise a command interface to receive commands, wherein the data stream table manager modifies the data stream table according to the commands. Some embodiments comprise a processor to generate the commands received by the command interface. In some embodiments, the performance requirements for the at least one of the data streams comprise at least one of: a bandwidth required by the one at least of the data streams; a burst size required by the one at least of the data streams; a latency required by the one at least of the data streams; and a jitter required by the one at least of the data streams. In some embodiments, the resources comprise at least one of: a buffer resource for the at least one input circuit; a rate-limiting resource for the at least one input circuit; a buffer resource for the at least one output circuit; a scheduler resource for at least one of the at least one input circuit and the at least one output circuit; a rate-limiting resource for the at least one output circuit; and a buffer resource for the at least one output circuit. Some embodiments comprise a network device selected from the group consisting of a switch; and a router. Some embodiments comprise a wireless network device which is otherwise compliant with at least one standard selected from the group consisting of IEEE standards 802.11, 802.11a, 802.11b, 802.11g, 802.11n, 802.16, and 802.20.

In general, in one aspect, the invention features an apparatus comprising: a plurality of resource means for processing packets of data in a plurality of data streams each comprising a plurality of the packets of data, wherein at least one of the data streams has at least one performance requirement; means for storing a data stream table; data stream table manager means for determining whether the performance requirements of the at least one of the data streams can be accepted based on entries in the data stream table, and for storing the performance requirements for the at least one of the data streams as entries in the data stream table when the performance requirements for the at least one of the data streams are acceptable; and resource programmer means for programming the resources according to the data stream table.

In some embodiments, the data streams comprise at least one media stream. Some embodiments comprise at least one means for receiving the data streams; at least one means for transmitting the data streams; and means for forwarding comprising at least one of the resource means, wherein the at least one of the resource means transfers the packets of data from the at least one means for receiving to the at least one means for transmitting. Some embodiments comprise performance requirements parsing means for determining the performance requirements for the at least one of the data streams. In some embodiments, the at least one means for receiving receives a stream performance requirements packet representing the performance requirements for the at least one of the data streams; and the performance requirements parsing means determines the performance requirements for the at least one of the data streams based on the stream performance requirements packet. In some embodiments, to determine the performance requirements for the at least one of the data streams, the performance requirements parsing means parses the packets of data in the at least one of the data streams. Some embodiments comprise an alert circuit to generate an alert when the data stream table manager determines that the performance requirements for any of the data streams are unacceptable. Some embodiments comprise an alert circuit to generate an alert when one of the entries in the data stream table expires. Some embodiments comprise a command interface to receive commands, wherein the data stream table manager modifies the data stream table according to the commands. Some embodiments comprise a processor to generate the commands received by the command interface. In some embodiments, the performance requirements for the at least one of the data streams comprise at least one of: a bandwidth required by the one at least of the data streams; a burst size required by the one at least of the data streams; a latency required by the one at least of the data streams; and a jitter required by the one at least of the data streams. In some embodiments, the resources comprise at least one of: a buffer resource for the at least one means for receiving; a rate-limiting resource for the at least one means for receiving; a buffer resource for the at least one means for transmitting; a scheduler resource for at least one of the at least one means for receiving and the at least one means for transmitting; a rate-limiting resource for the at least one means for transmitting; and a buffer resource for the at least one means for transmitting. Some embodiments comprise a network device selected from the group consisting of: a switch; and a router. Some embodiments comprise a wireless network device which is otherwise compliant with at least one standard selected from the group consisting of IEEE standards 802.11, 802.11a, 802.11b, 802.11g, 802.11n, 802.16, and 802.20.

In general, in one aspect, the invention features a method comprising: processing a plurality of data streams using a plurality of resources, wherein each of the data streams comprises a plurality of packets of data, and wherein at least one of the data streams has at least one performance requirement; storing a data stream table; determining whether the performance requirements for the at least one of the data streams can be accepted based on the entries in the data stream table; storing the performance requirements for the at least one of the data streams in the data stream table when the performance requirements for the at least one of the data streams are acceptable; and programming the resources according to the data stream table.

In some embodiments, the data streams comprise at least one media stream. Some embodiments comprise receiving the plurality of data streams into at least one input circuit; transmitting the data streams from at least one output circuit; and transferring the packets of data from the at least one input circuit to the at least one output circuit using at least one of the resources. Some embodiments comprise determining the performance requirements for the at least one of the data streams. Some embodiments comprise receiving a stream performance requirements packet representing the performance requirements for the at least one of the data streams; and determining the performance requirements for the at least one of the data streams based on the stream performance requirements packet. In some embodiments, determining the performance requirements for the at least one of the data streams comprises: parsing the packets of data in the one of the data streams. Some embodiments comprise generating an alert when the performance requirements for any of the data streams are unacceptable. Some embodiments comprise generating an alert when one of the entries in the data stream table expires. Some embodiments comprise receiving commands; and modifying the data stream table according to the commands. Some embodiments comprise generating the commands. In some embodiments, the performance requirements for the at least one of the data streams comprise at least one of: a bandwidth required by the at least one of the data streams; a burst size required by the at least one of the data streams; a latency required by the at least one of the data streams; and a jitter required by the at least one of the data streams. In some embodiments, the resources comprise at least one of: a buffer resource; a rate-limiting resource; and a buffer resource.

In general, in one aspect, the invention features a computer program comprising: identifying a plurality of data streams, wherein each of the data streams comprises a plurality of packets of data, and wherein at least one of the data streams has at least one performance requirement; storing a data stream table; determining whether the performance requirements for the at least one of the data streams can be accepted based on the entries in the data stream table; storing the performance requirements for the at least one of the data streams in the data stream table when the performance requirements for the at least one of the data streams are acceptable; and programming a plurality of resources for processing the at least one data stream according to the data stream table.

In some embodiments, the data streams comprise at least one media stream. Some embodiments comprise determining the performance requirements for the at least one of the data streams. Some embodiments comprise receiving a stream performance requirements packet representing the performance requirements for the at least one of the data streams; and determining the performance requirements for the at least one of the data streams based on the stream performance requirements packet. In some embodiments, determining the performance requirements for the at least one of the data streams comprises: parsing the packets of data in the one of the data streams. Some embodiments comprise generating an alert when the performance requirements for any of the data streams are unacceptable. Some embodiments comprise generating an alert when one of the entries in the data stream table expires. Some embodiments comprise receiving commands; and modifying the data stream table according to the commands. Some embodiments comprise generating the commands. In some embodiments, the performance requirements for the at least one of the data streams comprise at least one of: a bandwidth required by the at least one of the data streams; a burst size required by the at least one of the data streams; a latency required by the at least one of the data streams; and a jitter required by the at least one of the data streams. In some embodiments, the resources comprise at least one of: a buffer resource; a rate-limiting resource; and a scheduler resource.

The details of one or more implementations are set forth in the accompanying drawings and the description below. Other features will be apparent from the description and drawings, and from the claims.

Figure 1:
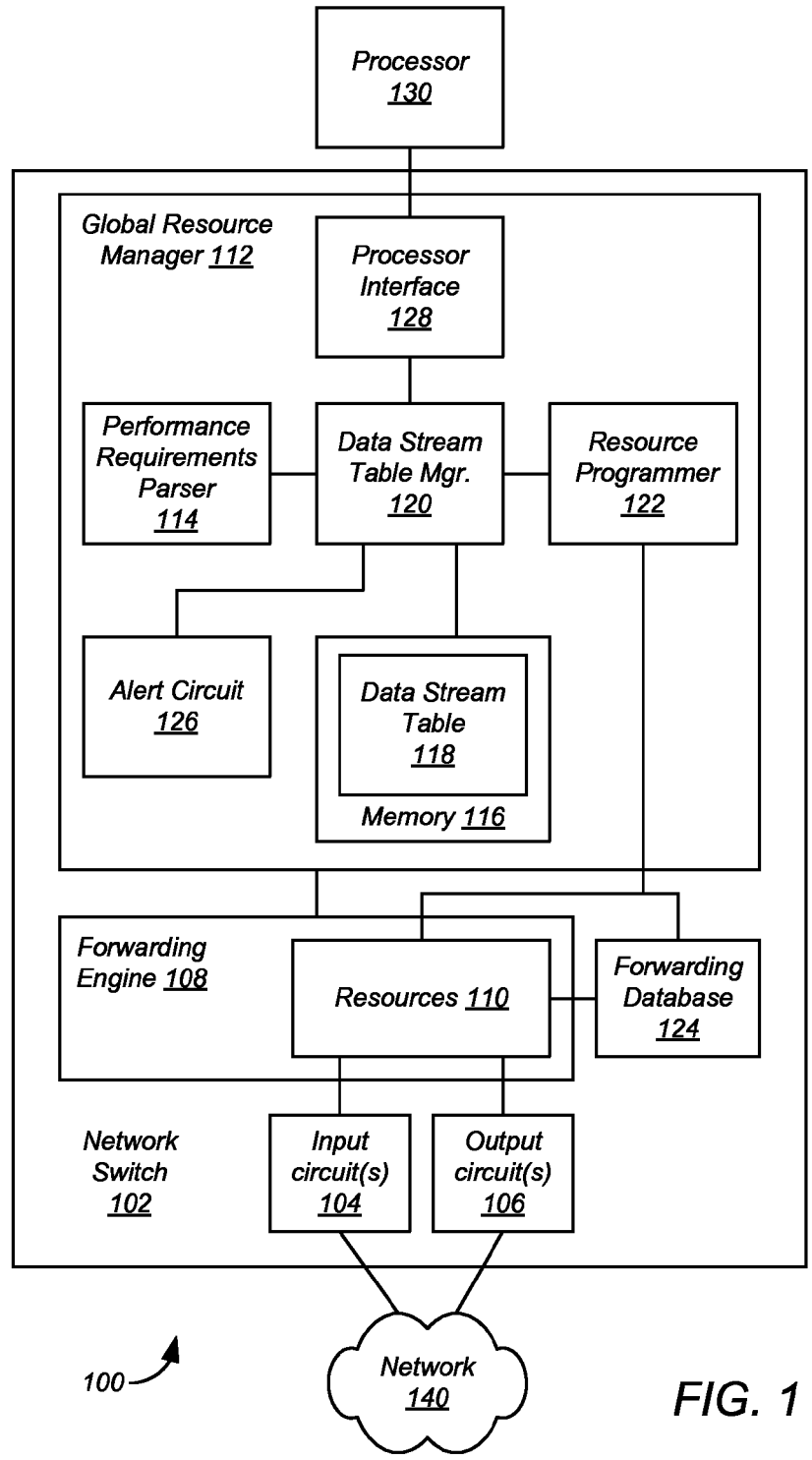
FIG. 1 shows a data communication system according to a preferred embodiment of the present invention.

The leading digits of each reference numeral used in this specification indicates the number of the drawing in which the reference numeral first appears.

DESCRIPTION

Currently in present-day switches resources are managed at an individual resource level. The disadvantage of this approach is that a packet of data that is assigned one or more switch resources could still be discarded within the switch due to the lack of another resource. This situation makes it difficult to offer any quality of treatment guarantees for data streams.

Embodiments of the present invention provide global switch resource managers to globally manage the resources of network switches according to performance requirements of the data streams switched by the switch. More generally, embodiments of the present invention provide resource managers to globally manage the resources of an apparatus processing multiple data streams according to performance requirements of the data streams. Embodiments of the present invention are especially useful for media streams that require resource guarantees, such as video and audio streams. However, embodiments of the present invention can be used with any sort of data stream, such as more traditional data streams that require best effort with some prioritization. According to a preferred embodiment of the present invention, a global switch resource manager determines the performance requirements of each data stream, and if the performance requirements are acceptable, records the performance requirements and allocates the resources of the switch to the data stream accordingly.

FIG. 1 shows a data communication system 100 according to a preferred embodiment of the present invention. Data communication system 100 comprises a network switch 102 in communication with a network 140. Network 140 can comprise a local-area network (LAN), which can be a wired LAN, a wireless LAN (WLAN), or the like. In some embodiments, network switch 102 is implemented within network devices such as routers and the like. In wireless embodiments, network switch 102 is preferably otherwise compliant with at least one of IEEE standards 802.11, 802.11a, 802.11b, 802.11g, 802.11n, 802.16, and 802.20.

Network switch 102 comprises at least one input circuit 104 to receive a plurality of data streams each comprising a plurality of packets of data, at least one output circuit 106 to transmit the data streams, a forwarding engine 108 comprising a plurality of resources 110 to transfer the packets of data from input circuit(s) 104 to output circuit(s) 106, and a global resource manager 112 to program the resources 110 according to performance requirements for each of the data streams.

Global resource manager 112 comprises a performance requirements parser 114 to determine the performance requirements for each of the data streams, a memory 116 to store a data stream table 118, a data stream table manager 120 to determine whether the performance requirements for each data stream can be accepted based on the entries in data stream table 118, and when the performance requirements for a data stream are acceptable, to store the performance requirements for the data stream in data stream table 118, and a resource programmer 122 to program resources 110 according to data stream table 118. Network switch 102 also preferably comprises a forwarding database 124 which is used by forwarding engine 108 to transfer the packets. Global resource manager 112 optionally comprises an alert circuit 126 to generate an alert when data stream table manager 120 determines that the performance requirements for any of the data streams are unacceptable, and a processor interface 128 to receive processor commands to modify data stream table 118. Global resource manager 112 optionally comprises a processor 130 to generate the processor commands.

Figure 2:
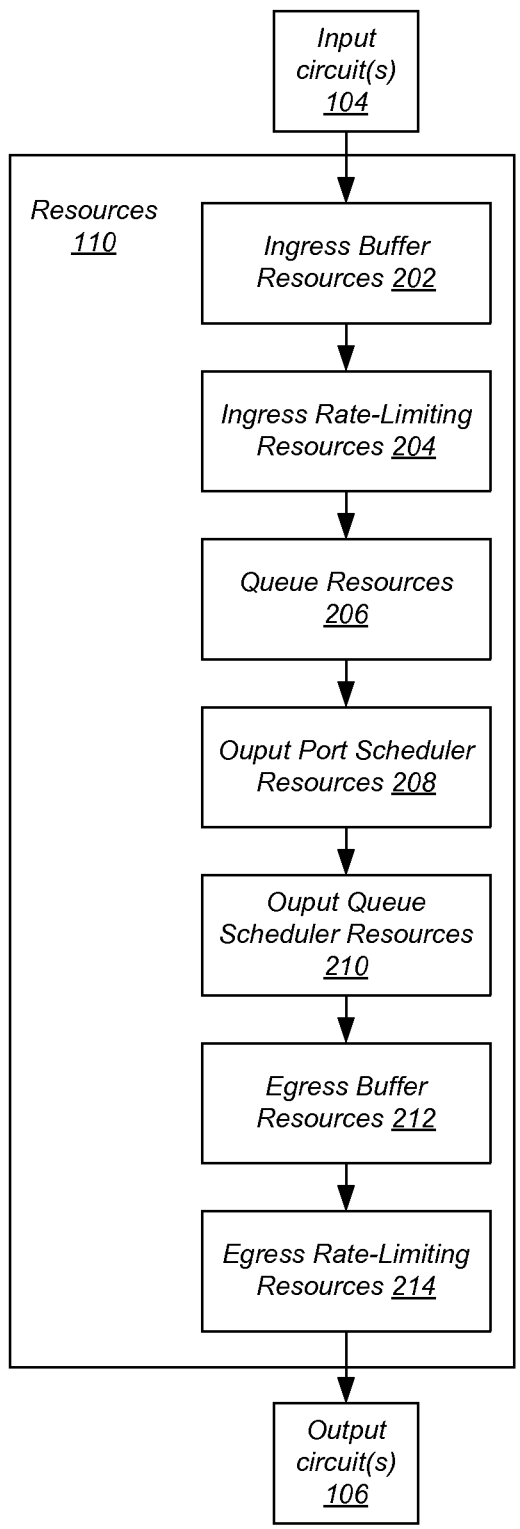
FIG. 2 shows detail of forwarding engine according to a preferred embodiment of the present invention.

FIG. 2 shows detail of resources 110 according to a preferred embodiment of the present invention. As stated above, forwarding engine 108 comprises a plurality of resources 110 to transfer the packets of data from input circuit(s) 104 to output circuit(s) 106. While resources 110 of forwarding engine 108 are described in the context of an output-queued switch, other resources can be used in other types of switches, as will be apparent to one skilled in the relevant arts after reading this description. Referring to FIG. 2, resources 110 comprise ingress buffer resources 202 and ingress rate-limiting resources 204 for input circuit(s) 104, queue resources 206 for output circuit(s) 106, output port scheduler resources 208 and output queue scheduler resources 210 for output circuit(s) 106, and egress buffer resources 212 and egress rate-limiting resources 214 for output circuit(s) 106. Buffer and queue resources 202, 206, and 212 can comprise, for example, an allocation in a buffer or queue, an allocation of buffer or queue pointers, and the like. Scheduler and rate-limiting resources 204, 208, 210, and 214 can comprise, for example, an allocation of a priority in a priority scheme, an allocation of time slots in a schedule, and the like.

Figure 3:
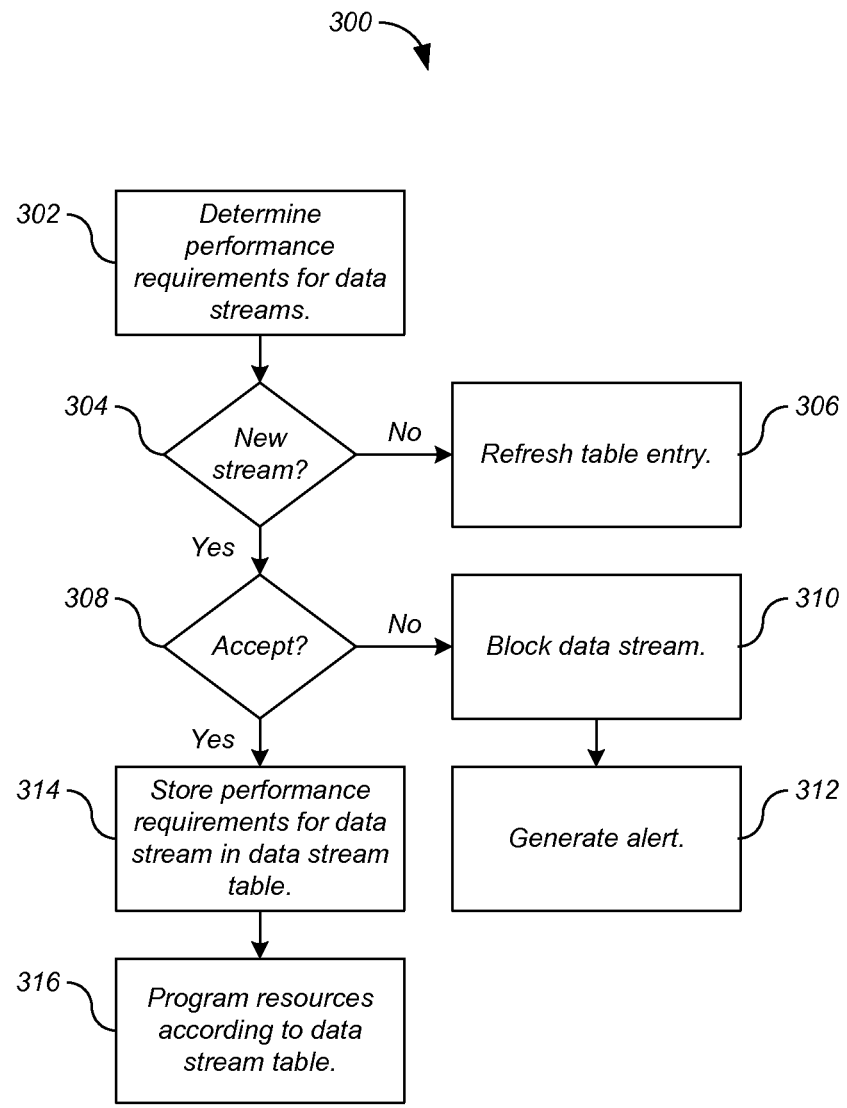
FIG. 3 shows a process for the network switch of FIG. 1 according to a preferred embodiment of the present invention.

FIG. 3 shows a process 300 for network switch 102 of FIG. 1 according to a preferred embodiment of the present invention. Performance requirements parser 114 determines the performance requirements for the data streams to be handled by network switch 102 (step 302). In some cases, the requirements for a data stream are conveyed by a special stream performance requirements packet representing the performance requirements for the data stream. In such cases, performance requirements parser 114 preferably determines the performance requirements for each data stream based on the respective stream performance requirements packet. In other cases, the requirements for a data stream can be obtained by monitoring setup packets for the data stream, for example with asynchronous transfer mode (ATM) data streams, frame relay data streams, and the like. In such cases, performance requirements parser 114 preferably determines the performance requirements for the data stream based on the respective setup packets.

Data stream table manager 120 reads data stream table 118 to determine whether the data stream is a new stream, or instead a data stream already stored in data stream table 118 (step 304). If the data stream already has an entry in data stream table 118, data stream table manager 120 optionally refreshes the entry (step 306). For example, some embodiments employ aging mechanisms to remove data streams from data stream table 118 after predetermined intervals unless refreshed.

But when the data stream is a new stream, data stream table manager 120 determines whether the performance requirements of the data stream can be accepted based on the entries in data stream table 118 (step 308). When the performance requirements for the data stream are unacceptable, data stream table manager 120 optionally blocks the data stream (step 310). For example, data stream table manager 120 modifies forwarding database 124 so that forwarding engine 108 simply drops all of the packets in the data stream. In some embodiments, alert circuit 126 generates an alert indicating that the performance requirements for the data stream are unacceptable (step 312). For example, the alert can be sent to a system administrator, an application, a higher-level protocol, and the like. In embodiments employing aging mechanisms for the entries in data stream table 118, alert circuit 126 can generate an alert when one of the entries in data stream table 118 expires.

But when the performance requirements for the data stream are acceptable, data stream table manager 120 stores the performance requirements for the data stream in data stream table 118 (step 314). The performance requirements for a data stream can comprise a bandwidth required by the data stream, a burst size required by the data stream, a latency required by the data stream, a jitter required by the data stream, and the like.

The bandwidth requirement indicates the bandwidth needed for the data stream. In some embodiments the bandwidth requirement can range from 64 kbps to 1 Gbps, can be specified in 64 kbps steps from 0 to 1 Mbps, 1 Mbps steps from 1 Mbps to 100 Mbps, and 10 Mbps steps from 100 Mbps to 1 Gbps, and is stored in data stream table 118 as an 8-bit value.

The burst size requirement indicates the amount of burst that the application expects to be supported in the switch hardware. In some embodiments the burst size requirement can range from 64 KBytes to 16 MBytes in steps of 64 Kbytes, and is stored in data stream table 118 as an 8-bit value.

The latency requirement indicates the amount of latency the user application is sensitive to. For example video/audio applications could be more sensitive to latency than data applications. In some embodiments the latency requirement can range from 10 μs to 2000 μs, and is stored in data stream table 118 as a 12-bit value.

The jitter requirement indicates the amount of jitter the user application is sensitive to. In some embodiments the jitter requirement can range from 10 μs to 2000 μs, and is stored in data stream table 118 as an 8-bit value.

Of course other embodiments can handle these and other sorts of requirements in the same or different combinations, as will be apparent to one skilled in the relevant arts after reading this description.

Resource programmer 122 programs resources 110 according to data stream table 118 (step 316). For example, resource programmer 122 modifies the parameters for resources 110 according to techniques well-known in the relevant arts. The parameters for each resource 110 are generally stored in some sort of memory, such as flip-flops, ternary content-addressable memory (TCAM), and the like. Resource programmer 122 modifies the stored parameters according to data stream table 118. For example, resource programmer 122 determines rate-limiting thresholds for each data stream based on the bandwidth and latency requirements stored for those data streams in data stream table 118, and writes those thresholds to the parameter memories for ingress rate-limiting resources 204 and egress rate-limiting resources 214.

Resource programmer 122 preferably is triggered to program resources 110 by data stream table manager 120 on each update of data stream table 118. But in some embodiments, resource programmer 122 can poll data stream table manager 120 to discover updates to data stream table 118.

Resources 110 preferably processes each of the packets in the data streams handled by network switch 102 according to the data stream to which the packets belong. Network switch 102 identifies the data stream to which each packet belongs as the packet is received, and assigns a corresponding data stream ID to the packet. For example, the data stream ID can be attached to the packet as a tag. Each resource 110 then identifies the data stream for each packet according to the tag, and processes the packet according to the parameters programmed for that data stream by resource programmer 122.

Some embodiments comprise a processor interface 128 to receive processor commands to modify data stream table 118, thereby allowing applications to establish requirements directly, and even before the corresponding data stream is set up. For example, a service provider can set up streams for customer in advance. According to these embodiments, processor interface 128 receives the processor commands, and data stream table manager 120 modifies data stream table 118 according to the processor commands. In some embodiments, processor 130 is external to network switch 102. In other embodiments, network switch 102 comprises processor 130.

In some embodiments, only a percentage of resources 110 are allocated to data streams which require resource guarantees. This ensures that the data streams which don't need resource guarantees, such as best-effort data streams, don't starve out completely. For example, the percentage of a resource that can be reserved is stored in a programmable register for that resource 110. For example, if only 75% of all frame buffer pointers for queue resources 206 can be reserved then the register for queue resources 206 is programmed with the 75% number.

Figure 4B:
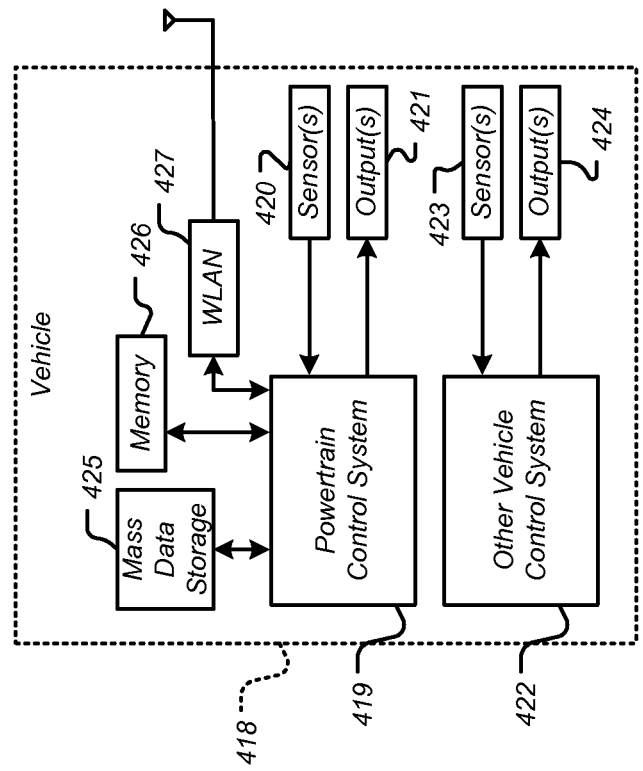
FIGS. 4A-4E show various exemplary implementations of the present invention.
Figure 4A:
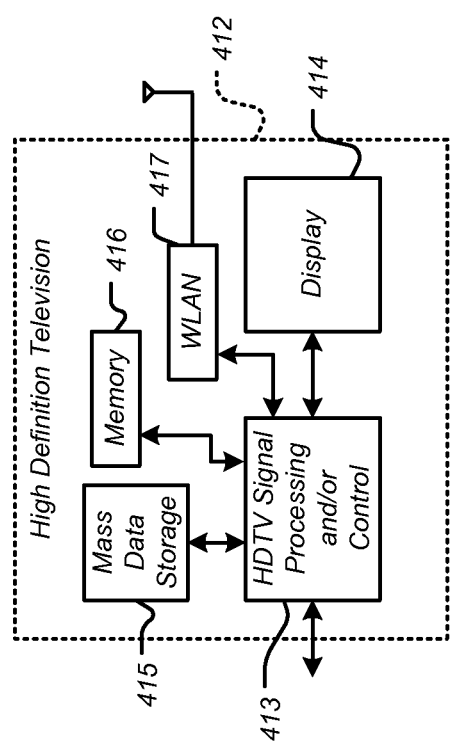

FIGS. 4A-4E show various exemplary implementations of the present invention. Referring now to FIG. 4A, the present invention can be implemented in a high definition television (HDTV) 412. The present invention may implement either or both signal processing and/or control circuits, which are generally identified in FIG. 4A at 413, a WLAN interface and/or mass data storage of the HDTV 412. The HDTV 412 receives HDTV input signals in either a wired or wireless format and generates HDTV output signals for a display 414. In some implementations, signal processing circuit and/or control circuit 413 and/or other circuits (not shown) of the HDTV 412 may process data, perform coding and/or encryption, perform calculations, format data and/or perform any other type of HDTV processing that may be required.

The HDTV 412 may communicate with mass data storage 415 that stores data in a nonvolatile manner such as optical and/or magnetic storage devices. The HDD may be a mini HDD that includes one or more platters having a diameter that is smaller than approximately 1.8". The HDTV 412 may be connected to memory 416 such as RAM, ROM, low latency nonvolatile memory such as flash memory and/or other suitable electronic data storage. The HDTV 412 also may support connections with a WLAN via a WLAN network interface 417.

Referring now to FIG. 4B, the present invention implements a control system of a vehicle 418, a WLAN interface and/or mass data storage of the vehicle control system. In some implementations, the present invention implements a powertrain control system 419 that receives inputs from one or more sensors 420 such as temperature sensors, pressure sensors, rotational sensors, airflow sensors and/or any other suitable sensors and/or that generates one or more output control signals 421 such as engine operating parameters, transmission operating parameters, and/or other control signals.

The present invention may also be implemented in other control systems 422 of the vehicle 418. The control system 422 may likewise receive signals from input sensors 423 and/or output control signals to one or more output devices 424. In some implementations, the control system 422 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 419 may communicate with mass data storage 425 that stores data in a nonvolatile manner. The mass data storage 425 may include optical and/or magnetic storage devices for example hard disk drives HDD and/or DVDs. The HDD may be a mini HDD that includes one or more platters having a diameter that is smaller than approximately 1.8". The powertrain control system 419 may be connected to memory 426 such as RAM, ROM, low latency nonvolatile memory such as flash memory and/or other suitable electronic data storage. The powertrain control system 419 also may support connections with a WLAN via a WLAN network interface 427. The control system 422 may also include mass data storage, memory and/or a WLAN interface (all not shown).

Figure 4C:
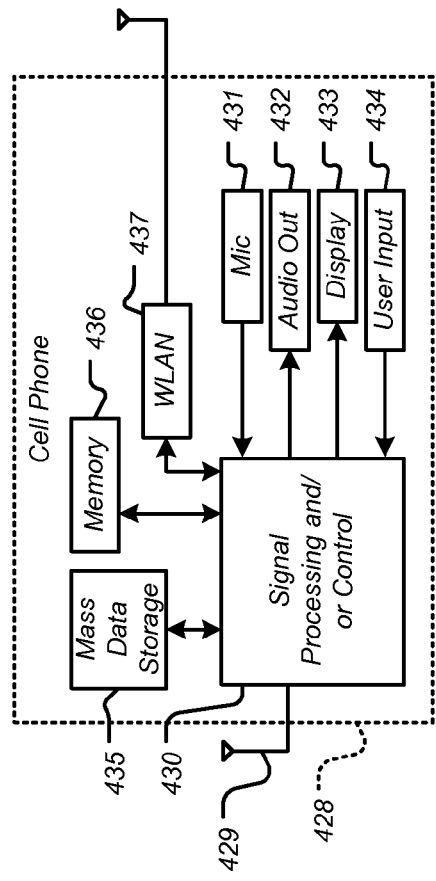

Referring now to FIG. 4C, the present invention can be implemented in a cellular phone 428 that may include a cellular antenna 429. The present invention may implement either or both signal processing and/or control circuits, which are generally identified in FIG. 4C at 430, a WLAN interface and/or mass data storage of the cellular phone 428. In some implementations, the cellular phone 428 includes a microphone 431, an audio output 432 such as a speaker and/or audio output jack, a display 433 and/or an input device 434 such as a keypad, pointing device, voice actuation and/or other input device. The signal processing and/or control circuits 430 and/or other circuits (not shown) in the cellular phone 428 may process data, perform coding and/or encryption, perform calculations, format data and/or perform other cellular phone functions.

The cellular phone 428 may communicate with mass data storage 435 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 428 may be connected to memory 436 such as RAM, ROM, low latency nonvolatile memory such as flash memory and/or other suitable electronic data storage. The cellular phone 428 also may support connections with a WLAN via a WLAN network interface 437.

Figure 4D:
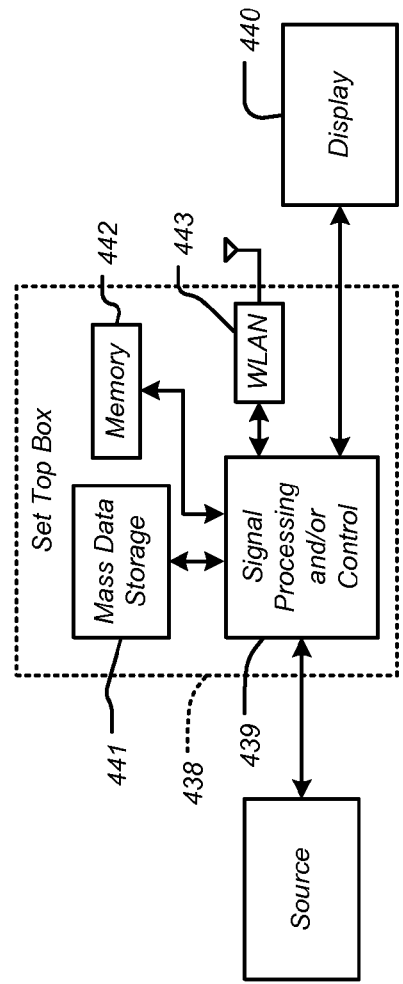

Referring now to FIG. 4D, the present invention can be implemented in a set top box 438. The present invention may implement either or both signal processing and/or control circuits, which are generally identified in FIG. 4D at 439, a WLAN interface and/or mass data storage of the set top box 438. The set top box 438 receives signals from a source such as a broadband source and outputs standard and/or high definition audio/video signals suitable for a display 440 such as a television and/or monitor and/or other video and/or audio output devices. The signal processing and/or control circuits 439 and/or other circuits (not shown) of the set top box 438 may process data, perform coding and/or encryption, perform calculations, format data and/or perform any other set top box function.

The set top box 438 may communicate with mass data storage 441 that stores data in a nonvolatile manner. The mass data storage 441 may include optical and/or magnetic storage devices for example hard disk drives HDD and/or DVDs. The HDD may be a mini HDD that includes one or more platters having a diameter that is smaller than approximately 1.8". The set top box 438 may be connected to memory 442 such as RAM, ROM, low latency nonvolatile memory such as flash memory and/or other suitable electronic data storage. The set top box 438 also may support connections with a WLAN via a WLAN network interface 443.

Figure 4E:
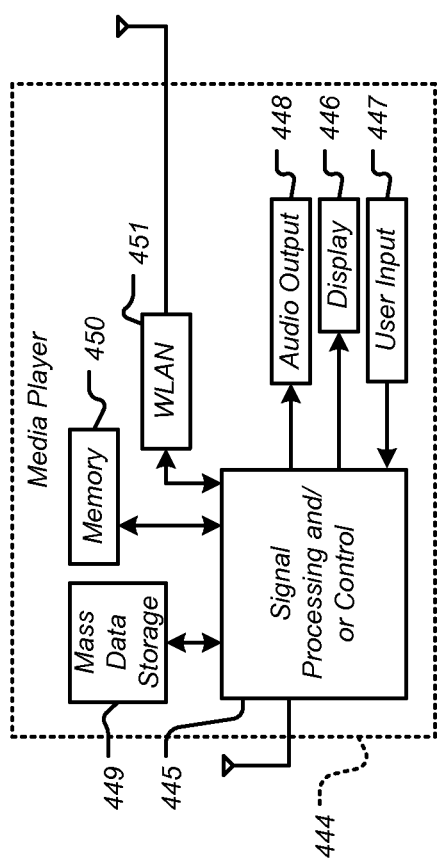

Referring now to FIG. 4E, the present invention can be implemented in a media player 444. The present invention may implement either or both signal processing and/or control circuits, which are generally identified in FIG. 4E at 445, a WLAN interface and/or mass data storage of the media player 444. In some implementations, the media player 444 includes a display 446 and/or a user input 447 such as a keypad, touchpad and the like. In some implementations, the media player 444 may employ a graphical user interface (GUI) that typically employs menus, drop down menus, icons and/or a point-and-click interface via the display 446 and/or user input 447. The media player 444 further includes an audio output 448 such as a speaker and/or audio output jack. The signal processing and/or control circuits 445 and/or other circuits (not shown) of the media player 444 may process data, perform coding and/or encryption, perform calculations, format data and/or perform any other media player function.

The media player 444 may communicate with mass data storage 449 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 444 may be connected to memory 450 such as RAM, ROM, low latency nonvolatile memory such as flash memory and/or other suitable electronic data storage. The media player 444 also may support connections with a WLAN via a WLAN network interface 451. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network device, comprising:
    an input circuit configured to receive, from a network, a plurality of data streams each comprising a plurality of packets of data;
    an output circuit configured to transmit, to the network, the plurality of data streams;
    a forwarding engine including a plurality of different types of resources used by the network device for transmission of the plurality of data streams, wherein the plurality of different types of resources includes (i) an allocation of buffer or queue pointers and (ii) an allocation of time slots in a schedule, the forwarding engine configured to transfer the packets of data from the input circuit to the output circuit using the plurality of different types of resources; and
    a resource manager configured to
        determine performance requirements for each of the plurality of data streams,
        determine whether the performance requirements for each of the plurality of data streams can be accepted,
        store, in a data stream table, data entries corresponding to the performance requirements for each of the plurality of data streams in response to a determination that the performance requirements can be accepted, and
        program, for each of the plurality of data streams, the plurality of different types of resources based on the data entries stored in the data stream table.

2. The network device of claim 1, wherein the plurality of different types of resources further includes at least two of ingress buffer resources, ingress rate-limiting resources, queue resources, output port scheduler resources, output queue scheduler resources, egress buffer resources, and egress rate-limiting resources.

3. The network device of claim 1, wherein the resource manager is configured to determine the performance requirements for each of the plurality of data streams based on performance requirements of data packets included in respective ones of the plurality of data streams.

4. The network device of claim 1, wherein the resource manager is configured to determine the performance requirements for each of the plurality of data streams based on setup packets included in respective ones of the plurality of data streams.

5. The network device of claim 1, wherein the resource manager is configured to determine whether each of the plurality of data streams is i) a new data stream, or ii) a data stream already having an associated data entry in the data stream table.

6. The network device of claim 5, wherein the resource manager is configured to selectively refresh an associated data entry for the data stream already having an associated entry in the data stream table.

7. The network device of claim 1, wherein the resource manager is configured to block selected ones of the plurality of data streams that have performance requirements that are not accepted.

8. The network device of claim 1, wherein the resource manager is configured to determine whether the performance requirements for each of the plurality of data streams can be accepted based on data entries already stored in the data stream table.

9. The network device of claim 1, wherein the performance requirements include at least two of a bandwidth required by a data stream, a burst size required by a data stream, a latency required by a data stream, and a jitter required by the data stream.

10. The network device of claim 1, wherein programming the plurality of different types of resources includes modifying at least one of the different types of resources according to two or more of the performance requirements.

11. A method, comprising:
    receiving, from a network, a plurality of data streams each comprising a plurality of packets of data; and
    transferring the packets of data to the network using a plurality of different types of resources, wherein the resources are used for transmission of the plurality of data streams, and wherein the plurality of different types of resources includes (i) an allocation of buffer or queue pointers and (ii) an allocation of time slots in a schedule;
    wherein the transferring the packets includes
        determining performance requirements for each of the plurality of data streams,
        determining whether the performance requirements for each of the plurality of data streams can be accepted,
        storing, in a data stream table, data entries corresponding to the performance requirements for each of the plurality of data streams in response to a determination that the performance requirements can be accepted, and
        programming, for each of the plurality of data streams, the plurality of different types of resources based on the data entries stored in the data stream table.

12. The method of claim 11, wherein the plurality of different types of resources further includes at least two of ingress buffer resources, ingress rate-limiting resources, queue resources, output port scheduler resources, output queue scheduler resources, egress buffer resources, and egress rate-limiting resources.

13. The method of claim 11, wherein the determining the performance requirements for each of the plurality of data streams includes determining the performance requirements based on performance requirements of data packets included in respective ones of the plurality of data streams.

14. The method of claim 11, wherein the determining the performance requirements for each of the plurality of data streams includes determining the performance requirements based on setup packets included in respective ones of the plurality of data streams.

15. The method of claim 11, further comprising determining whether each of the plurality of data streams is i) a new data stream, or ii) a data stream already having an associated data entry in the data stream table.

16. The method of claim 15, further comprising selectively refreshing an associated data entry for the data stream already having an associated entry in the data stream table.

17. The method of claim 11, further comprising blocking selected ones of the plurality of data streams that have performance requirements that are not accepted.

18. The method of claim 11, wherein the determining whether the performance requirements for each of the plurality of data streams can be accepted includes determining whether the performance requirements can be accepted based on data entries already stored in the data stream table.

19. The method of claim 11, wherein the performance requirements include at least two of a bandwidth required by a data stream, a burst size required by a data stream, a latency required by a data stream, and a jitter required by the data stream.

20. The method of claim 11, wherein programming the plurality of different types of resources includes modifying at least one of the different types of resources according to two or more of the performance requirements.

* * * * *